Dec. 19, 1967 D. SIMONOVIĆ 3,358,395

UNIVERSAL MULTI-PURPOSE DISPLAY DEVICE

Filed May 24, 1965 4 Sheets-Sheet 1

Inventor:
Dragoljub Simonović
By
Watson, Cole, Grindle & Watson
Attys.

Dec. 19, 1967  D. SIMONOVIĆ  3,358,395
UNIVERSAL MULTI-PURPOSE DISPLAY DEVICE
Filed May 24, 1965  4 Sheets-Sheet 2
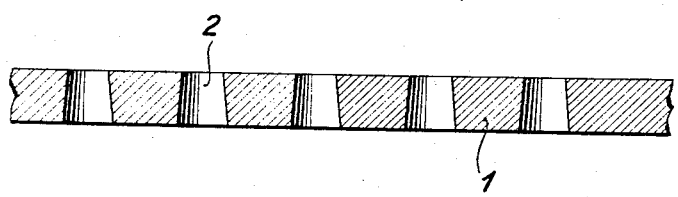
Fig. 2
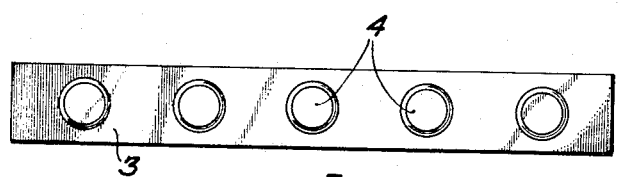
Fig. 3
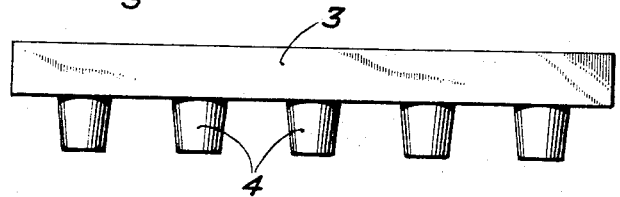
Fig. 3A
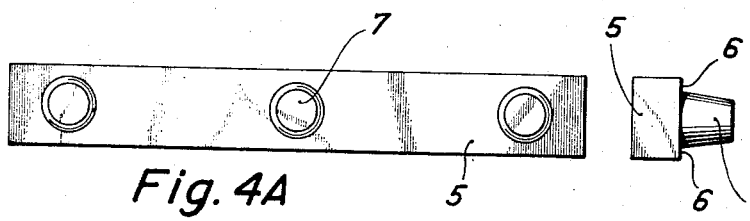
Fig. 4
Fig. 4A
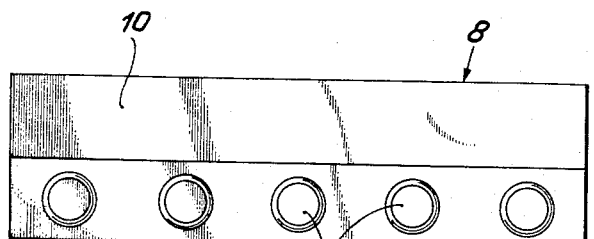
Fig. 5A
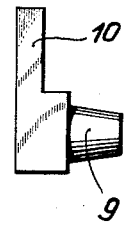
Fig. 5
Inventor:
Dragoljub Simonović
By
Watson, Cole, Grindle & Watson
Attys.

Dec. 19, 1967    D. SIMONOVIĆ    3,358,395
UNIVERSAL MULTI-PURPOSE DISPLAY DEVICE
Filed May 24, 1965    4 Sheets-Sheet 3
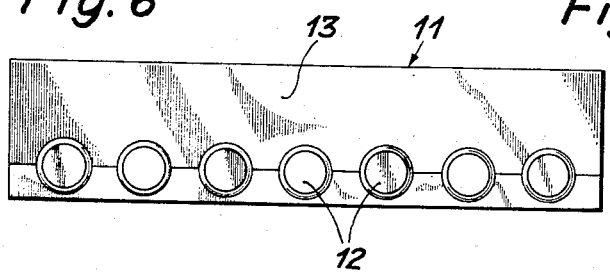
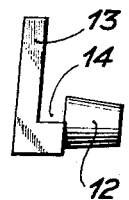
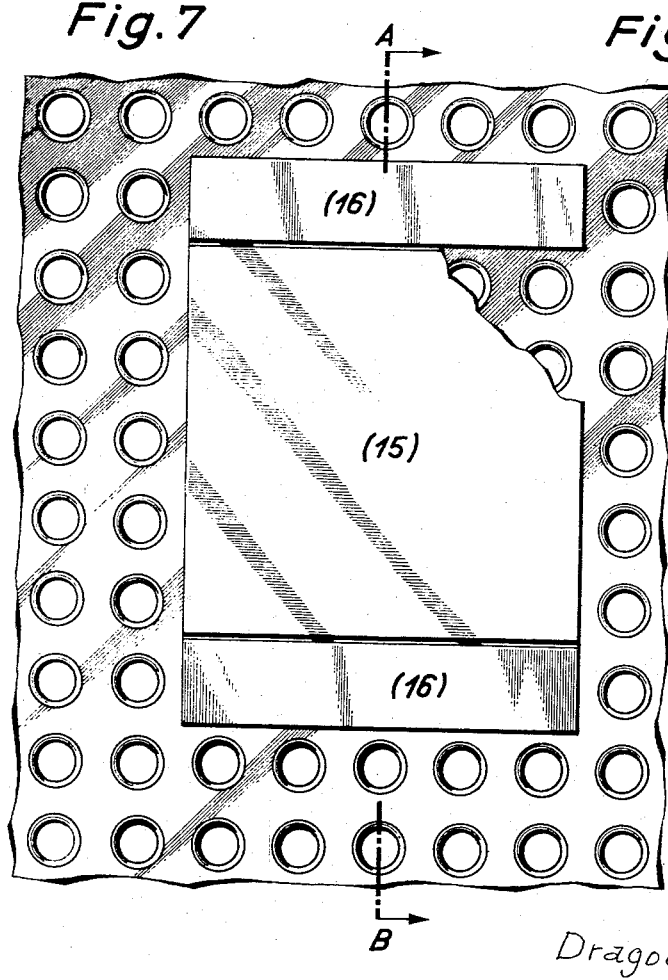
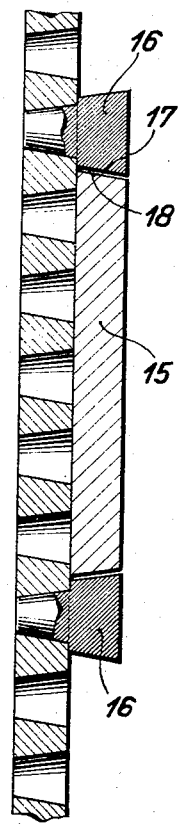
Inventor:
Dragoljub Simonović
By
Watson, Cole, Grindle & Watson
Attys.

Dec. 19, 1967     D. SIMONOVIĆ     3,358,395
UNIVERSAL MULTI-PURPOSE DISPLAY DEVICE
Filed May 24, 1965     4 Sheets-Sheet 4
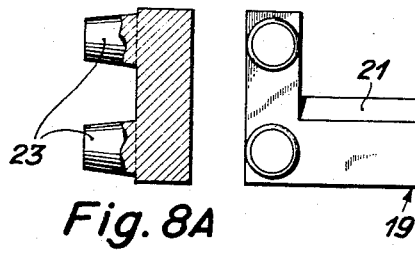
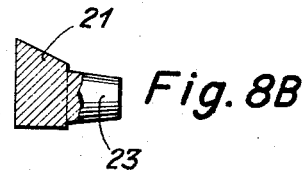
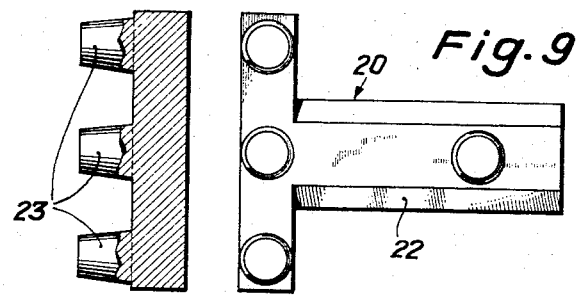
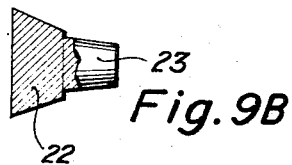
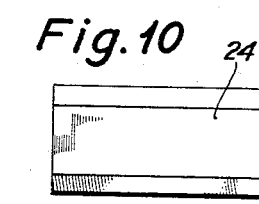
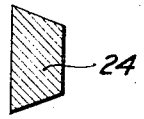
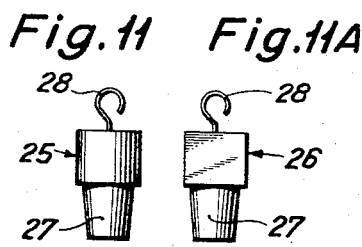
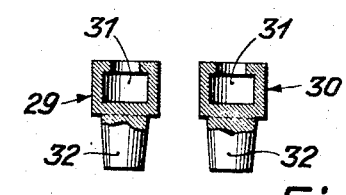
Inventor:
Dragoljub Simonović
By
Watson, Cole, Grindle & Watson
Attys United States Patent Office 3,358,395
Patented Dec. 19, 1967

3,358,395
UNIVERSAL MULTI-PURPOSE DISPLAY DEVICE
Dragoljub Simonović, Saarbrucken, Germany, assignor to Firma GTV Gesellschaft fur Transport und Verkehrswesen m.b.H., Saarbrucken, Germany
Filed May 24, 1965, Ser. No. 458,347
Claims priority, application Germany, June 25, 1964, G 40,674
1 Claim. (Cl. 40—63)

Display devices or charts to manage, plan, watch or observe, and for statistical purposes are known in many different forms. They are all, however, constructed to indicate definite information which also refers to the indicating elements. Thus, for example, display devices are known in connection with which parallel arranged tracks are provided in which strip-like indicator elements are arranged to be laterally slidable. In another type of display device, the indicator elements are provided in colors which are separable from the plate by lines or tapes and are secured to pins which are associated in rows of holes in the plate so that the pins may be interchanged. Also in this case the indicator elements are only adjustable in their tracks so that the display device is limited only to a very specific purpose.

The present invention has for an object to provide a universal multi-purpose display device or tablet whereby the observer will see information and disclosures as for example over an entire many-sided working program for which there is a pictorial or graphic representation with different requirements and which are not fulfilled by such sight plates known heretofore, due to the fact that in the frame of the plate the same indicating system is included. It is, however, obvious that many different details in a work program, such as delivery dead-lines, machine availability, work power demands, material stock, etc. and constant changes cannot or only very superficially, may be included in the same indicating method.

The present invention has fundamentally the object to provide a carrier or support plate to universally use indicating elements so that the variations in the choice of the indicating system may be employed and that the choice for a particular purpose shall show on the indicating system by the specific formation of the indicating and holding elements. As a universal carrying plate, as a further object of the invention, there is provided on the plate, lines of holes or perforations, particularly having equal distances between the holes. In this way the indicating and holding elements are provided to furnish various informative systems and provided with peg or plug members which agree with the pattern of the holes in the carrying plate. For specific indicating purposes these can be provided as simple plugs which may also be formed or provided with sight straps for shifting purposes.

Further objects will be apparent from the following description when considered in connection with the accompanying drawings in which:

FIG. 1 is a top plan view of a universal multi-purpose display device according to the invention, FIG. 2 is a cross-section through a portion of the device according to the invention, FIG. 3 is a bottom plan view of a form of indicating element, FIG. 3A is a side elevation of the element of FIG. 3, FIG. 4 is an end view of a further form of indicating element, FIG. 4A is a bottom plan view of the element of FIG. 4, FIG. 5 is an end view of a further modified form of indicating element, FIG. 5A is a bottom plan view of the element of FIG. 5, FIG. 6 is a bottom plan view of a still further modified form of indicating element, FIG. 6A is an end view of the element of FIG. 6, FIG. 7 is a top plan view of a special display device according to the invention showing a horizontal shiftable indicating element, FIG. 7A is a cross-section taken on line A–B of FIG. 7 in the direction of the arrows, FIG. 8 is a top plan view of a special indicating element, FIGS. 8A and 8B are part cross-sections of the element of FIG. 8;

FIG. 9 is a top plan view of a further modified indicating element,

FIGS. 9A and 9B are partial cross-sections of the element of FIG. 9,

FIG. 10 is a top plan view of a slidable indicating element,

FIG. 10A is a cross-section of the element of FIG. 10,

Figure 1:
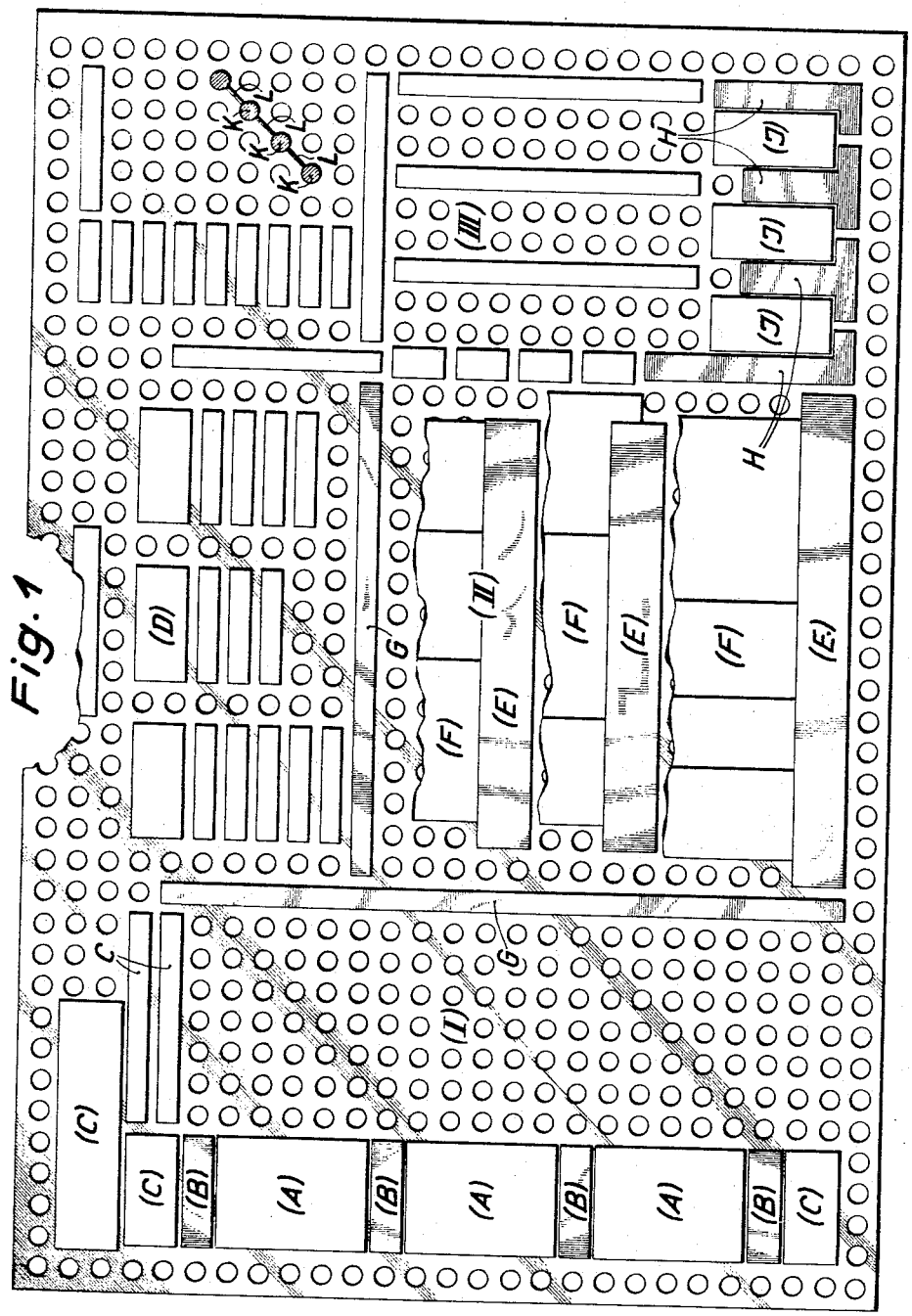

The FIGS. 11 and 11A are side elevations of two different plugs,

FIGS. 11B and C are top views of the plugs of FIGS. 11 and 11A,

FIGS. 12 and 12A are partial cross-sections of further modified indicating elements, and FIGS. 12B and 12C are top plan views of the elements of FIGS. 12 and 12A respectively.

In the showing of FIG. 1, it is intended to illustrate as an example various indicating systems which can be applied on a single plate in accordance with this invention. In the left field I there is employed an indicating system in which blank or indicia and data symbols may be applied on the indicating elements A between holding strips or tracks B and which are slidably mounted and are slidable and adjustable to the right. Adjacent thereto certain areas as indicating elements C may be applied. Also, special indicators can be applied by means of holes in the carrying plate by insertion of plugs and the like.

The middle field or area II is intended for the purpose of reading off values or numbers by suitable insertable and adjustable indicating elements D in the upper field or also by laterally slidable cards F in guide tracks E. The areas can be sub-divided and separated by vertical or horizontal strips G.

On the right field area III there can be provided holding elements H which will make it possible to adjust or slide indicating elements J and also plugs K can be applied together with sight tapes or bands L.

The structure of FIG. 1 shows that a display device according to the invention can be provided to function as an indicating system to visually show various figures and values as well as certain desired data, all on a single plate in convenient form. The display device according to the invention can be divided into areas or fields in which various indicating systems can be applied and worked out with the adjustment of certain plugs, the sliding of sections in their track members, and also to adjust the plugs by their tape elements. Also special holding means may be fixed on the plate or guided thereon.

FIG. 2 of the drawing shows the holes 2 in plate 1 as conical perforations as in cross-section the hole is frusto-conical. These holes 2 can receive therein conical plugs and such plugs are shown in FIG. 3 as frusto-conical plugs 4 secured on strips or indicating elements 3.

FIG. 4 shows an indicating element 5 having on its side, surface 6 with the conical plugs 7 mounted thereon. FIG. 4 shows also that the surface 6 is wider than the base of each frusto-conical plug 7.

FIG. 5 shows a holding element 8 which is also provided with a plurality of frusto-conical plugs 9 and a vertical strip 10 forming part of the main strip 8 having the plugs 9 thereon. This element 8 may be adjusted on the plate in its longitudinal direction. The holding element 11 of FIG. 6 carries also conical plugs 12 which are actually frusto-conical and the element 11 has a thinner strip portion 13 forming therewith a guide groove 14. Also, this holding element 11 will serve to take different slidable indicating elements and thus, the element 11 may act as an indicating member.

FIG. 7 shows a special form of the invention in which the indicating element 15 is slidably mounted on its board between holding members 16, whereby the elements at the edges 17 and 18 which form slide surfaces, are similar to a swallow-tail form.

FIGS. 8 and 9 show holding elements and of which 19 is a one-sided element and 20 a double-sided element, of which element 19 has a surface 21 of a half swallow-tail form and element 20 has two surfaces 22 as a full swallow-tail formation. The element 19 is L-shaped, whereas element 20 is T-shaped. These elements which have a plurality of frusto-conical plugs 23, serve the purpose to vertically adjust a similar swallow-tail profiled strip indicating element 24 as shown in FIG. 10.

FIG. 11 shows round 25 or square 26 sections with frusto-conical plugs 27 integral therewith and each has a hook 28 thereon to receive a band or tape.

FIG. 12 shows a round 29 and a square 30 section on each plug 29 and 30, respectively, and each with inner spaces 31 and frusto-conical sections 32 integral therewith which, for example, are for the purpose to insert in the spaces a color indicator of elastic artificial material as a plastic, for example.

The various examples illustrated and described in accordance with this invention are not to be considered as limited to such constructions but are only as examples since various modifications may be made within the scope of the appended claim.

The plate or board according to the invention can be made of various different materials as, for instance, artificial materials, wood or metals and can be made in any desired size, strength and of any form. Also, the indicators and holding elements are not of necessity made of any particular material or materials and they may have any suitable form and design and also of different colors.

I claim:

A universal multi-purpose display device for planning, statistical and other purposes, comprising a carrying plate having a plurality of holes therein arranged in rows with the holes equally spaced from each other as to the rows, and a plurality of indicating and holding elements with means on each element to be inserted and held in the respective holes, the elements being in the form of strips and each strip in cross-section having a swallow-tail configuration, and the indicating elements having a swallow-tail cross-section to cooperate with the swallow-tail strips, the swallow-tail configuration on the holding elements being inverted with respect to the swallow-tail configuration on the indicating elements.

References Cited

UNITED STATES PATENTS

| | | | |
|---|---|---|---|
| 2,814,894 | 12/1957 | Horton | 40—63 |
| 3,067,536 | 12/1962 | Brittson | 40—143 X |

FOREIGN PATENTS

| | | |
|---|---|---|
| 1,318,329 | 1/1963 | France. |
| 862,634 | 3/1961 | Great Britain. |

EUGENE R. CAPOZIO, *Primary Examiner.*

W. J. CONTRERAS, *Assistant Examiner.*